United States Patent
Miyahara et al.

(10) Patent No.: US 8,760,728 B2
(45) Date of Patent: Jun. 24, 2014

(54) TRANSPARENT PLATE FOR PLATEN, DOCUMENT SCANNING APPARATUS, AND IMAGE FORMING APPARATUS

(75) Inventors: Tomoko Miyahara, Kanagawa (JP); Hisae Yoshizawa, Kangawa (JP); Hiroshi Saegusa, Kangawa (JP); Kazunori Anazawa, Kanagawa (JP); Kaoru Torikoshi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 13 days.

(21) Appl. No.: 13/412,108

(22) Filed: Mar. 5, 2012

(65) Prior Publication Data

US 2013/0077135 A1   Mar. 28, 2013

(30) Foreign Application Priority Data

Sep. 22, 2011 (JP) .................................. 2011-207809

(51) Int. Cl.
*H04N 1/04* (2006.01)

(52) U.S. Cl.
USPC ........... 358/474; 358/501; 358/498; 359/297; 524/544

(58) Field of Classification Search
USPC ............ 358/474, 498, 501; 359/297; 524/544
See application file for complete search history.

(56) References Cited

U.S. PATENT DOCUMENTS

| | | | |
|---|---|---|---|
| 3,260,260 A | | 7/1966 | Questel |
| 4,017,172 A | * | 4/1977 | Lynch ........................... 399/215 |
| 4,618,527 A | | 10/1986 | Doyen |
| 5,070,415 A | * | 12/1991 | Matsumoto ................... 358/482 |
| 5,576,068 A | | 11/1996 | Caburet et al. |
| 5,583,662 A | * | 12/1996 | Takahashi et al. ............ 358/474 |
| 5,610,720 A | * | 3/1997 | Fujioka et al. ................ 358/296 |
| 5,790,275 A | * | 8/1998 | Iizuka ............................ 358/474 |
| 6,447,979 B1 | * | 9/2002 | Hattori et al. ............... 430/270.1 |
| 6,952,293 B2 | * | 10/2005 | Feng .............................. 358/497 |
| 8,368,970 B2 | * | 2/2013 | Kim .............................. 358/474 |

FOREIGN PATENT DOCUMENTS

JP      A-2010-68248      3/2010

OTHER PUBLICATIONS

Office Action dated Feb. 13, 2014 issued in U.S. Appl. No. 13/622,076.

* cited by examiner

*Primary Examiner* — Negussie Worku
(74) *Attorney, Agent, or Firm* — Oliff PLC

(57) ABSTRACT

Provided is a transparent plate for a platen which is used in a document scanning apparatus, including a transparent supporting member, and a transparent protective layer that has a self-repairability and has a surface coefficient of kinetic friction with respect to copy paper of 0.7 or less on the transparent supporting member.

16 Claims, 2 Drawing Sheets

TRANSPARENT PLATE FOR PLATEN, DOCUMENT SCANNING APPARATUS, AND IMAGE FORMING APPARATUS

CROSS-REFERENCE TO RELATED APPLICATIONS

This application is based on and claims priority under 35 USC 119 from Japanese Patent Application No. 2011-207809 filed Sep. 22, 2011.

BACKGROUND (i) Technical Field

The present invention relates to a transparent plate for a platen, a document scanning apparatus, and an image forming apparatus.

(ii) Related Art

As a document scanning apparatus that optically scans images on an original document in an image forming apparatus, such as a copier, a scanner, and the like, there is a platen set-type document scanning apparatus in which images on an original document placed on a platen glass are scanned and a document transporting-type document scanning apparatus in which images are scanned in a transporting process of an original document. In the document transporting-type, the image-containing surface of the original document transported on the platen glass is scanned through the platen glass.

SUMMARY

The above object can be achieved by the following aspects of the invention.

That is, according to an aspect of the invention, there is provided a transparent plate for a platen which is used in a document scanning apparatus, including:

a transparent supporting member; and a transparent protective layer that has a self-repairability and has a surface coefficient of kinetic friction with respect to copy paper of 0.7 or less on the transparent supporting member.

BRIEF DESCRIPTION OF THE DRAWINGS

Exemplary embodiments of the present invention will be described in detail based on the following figures, wherein.

DETAILED DESCRIPTION

Figure 1:
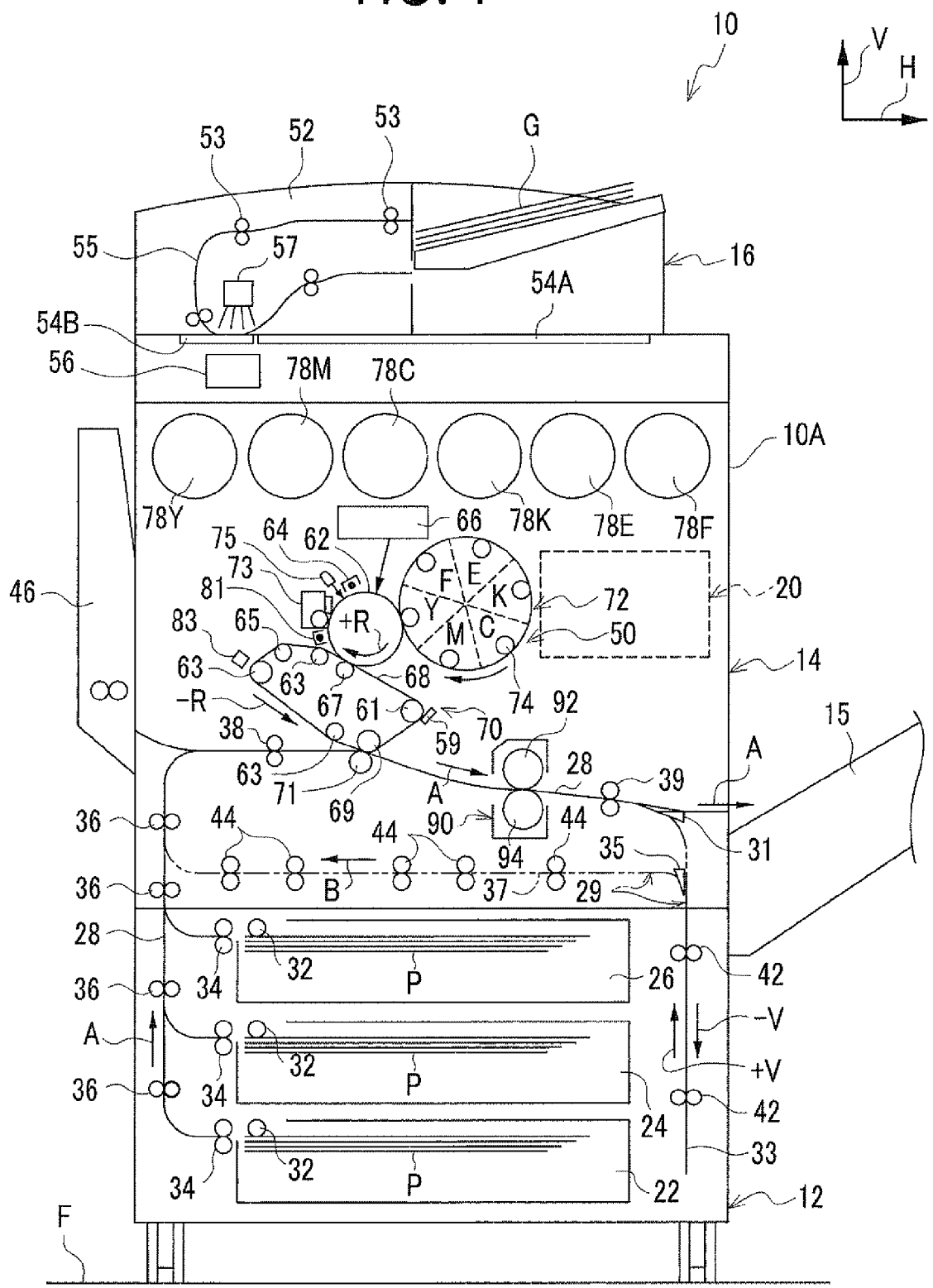
FIG. 1 is an overall configuration view of an image forming apparatus according to the exemplary embodiment.

Hereinafter, exemplary embodiments of the transparent plate for a platen, image-scanning apparatus, and image forming apparatus of the invention will be described in detail.

A transparent plate for a platen for document scanning apparatuses according to the exemplary embodiment has a transparent supporting member, and a transparent protective layer on the transparent supporting member which has a self-repairability and a surface coefficient of kinetic friction with respect to copy paper of 0.7 or less, and is used in a document scanning apparatus that scans a scan side of the copy paper which is an original document to be scanned disposed so as to contact the surface of the transparent protective layer.

The transparent plate for a platen for document scanning apparatuses is used for a document placement tray on which an original document to be scanned is placed in a document scanning apparatus in image forming apparatuses and the like. For the transparent plate for a platen, there are cases in which the surface of the transparent plate for a platen is scratched due to friction with an original document to be scanned or friction with foreign substances and the like interposed between the original document to be scanned and the transparent plate for a platen. Particularly, in the case of a document scanning apparatus having a document transporting portion that transports the original documents to be scanned one by one so that the scan side of the original document to be scanned contacts at least a part of the surface of the transparent plate for a platen on the transparent protective layer, the friction with the original document to be scanned or the friction with the foreign substances and the like in the transparent plate for a platen becomes more significant, and scratches tend to be caused more significantly. In addition, the problem of scratches is caused even in a case in which the original document to be scanned is a long sheet of paper, such as a design drawing.

In contrast to the above, since the transparent plate for a platen according to the exemplary embodiment has a transparent protective layer having a self-repairability and a surface coefficient of kinetic friction with respect to the copy paper in the above range, occurrence of scratches is suppressed even when friction with the original document to be scanned or foreign substances is caused on the surface of the transparent protective layer, and, furthermore, even in a case in which scratches are caused, the scratches are repaired, and therefore occurrence of scratches permanently remaining (permanent damage) on the surface of the transparent plate for a platen is efficiently suppressed. As a result, permanent damage-based image defects caused on a formed image due to the permanent damage on the surface of the transparent plate for a platen, which is scanned by the scanning apparatus, are suppressed.

In addition, the surface coefficient of kinetic friction of the transparent protective layer with respect to the copy paper in the above range also produces a slipping property with the copy paper, which is an original document to be scanned, and, in a case in which the transparent plate for a platen is applied particularly to a document scanning apparatus having the document transporting portion, the original document to be scanned is favorably transported by the document transporting portion.

—Definition of the Self-Repairability—

Here, the self-repairability refers to a property that repairs a strain caused by stress when the stress is eliminated, and, specifically, indicates that the "restoration rate" obtained by the following measurement method is 80% or more in the present specification.

Measurement Method of the Restoration Rate

FISCHERSCOPE HM2000 (manufactured by Fischer Instruments Ltd.) is used as a measuring apparatus, a coating liquid for forming a transparent protective layer is coated to a polyimide film, polymerized so as to form a sample transparent protective layer, fixed to a glass slide using an adhesive, and set in the measuring apparatus. An increasing load is applied to the sample transparent protective layer at a specific measuring temperature for 15 seconds up to 0.5 mN, and the load is held at 0.5 mN for 5 seconds. The maximum displacement at this time is indicated by (h1). After that, the load is decreased to 0.005 mN for 15 seconds, and held at 0.005 mN for 1 minute. The displacement at this time is indicated by (h2), and a restoration rate [{(h1−h2)/h1}×100(%)] is computed.

The restoration rate as described in the specification is measured by the above method.

—Self-Repairability Temperature—

Further, the temperature at which a self-repairability develops in the transparent protective layer in the exemplary embodiment (that is, a temperature at which the restoration rate becomes 80% or more: self-repairability temperature) may be any temperature as long as the temperature is in a temperature range in which a resin that forms the transparent protective layer can hold the shape of the formed transparent protective layer. Therefore, the "specific measuring temperature" in the method of measuring the restoration rate includes any temperature in the above temperature range.

Further, from the viewpoint of more efficient repair of damage, the self-repairability temperature in the transparent protective layer of the exemplary embodiment is preferably 10° C. to 100° C., more preferably 10° C. to 80° C., and particularly preferably 10° C. to 50° C.

From the viewpoint of suppressing deterioration of plastic parts (for example, an ABS resin) and the like which form the surrounding of the transparent plate for a platen in a document scanning apparatus, the heating temperature by a section which supplies heat as described below is preferably 100° C. or lower, and therefore the self-repairability temperature is preferably 100° C. or lower. On the other hand, from the viewpoint of easy formation of the transparent protective layer that satisfies the coefficient of kinetic friction in the above range, the self-repairability temperature is preferably 10° C. or higher.

—Temperature of the Transparent Plate for a Platen—

Even in a case in which the transparent protective layer in the transparent plate for a platen according to the exemplary embodiment is placed in a temperature environment other than the temperature at which the self-repairability develops (self-repairability temperature), damage is preferably repaired by placing the transparent protective layer in the temperature environment for a longer time (for example, a time of longer than 1 minute in a case in which a load is applied under the same conditions as for the method of measuring the restoration rate such that damage is caused).

However, from the viewpoint of more efficient repair of damage, when the transparent plate for a platen according to the exemplary embodiment is applied to a document scanning apparatus, it is preferable to use the transparent protective layer in the transparent plate for a platen in a temperature environment at which the self-repairability develops (that is, a temperature at which the restoration rate becomes 80% or more: self-restoring temperature).

Specifically, in a case in which the transparent plate for a platen is applied to an image forming apparatus having a heat-fixing apparatus and the like, heat is supplied to the transparent protective layer from heat generated from the main body of the image forming apparatus (for example, heated to a temperature of 25° C. to 45° C.). Therefore, damage is more efficiently repaired by applying the transparent protective layer at which the self-repairability develops in a temperature range which the transparent protective layer reaches due to heat generated from the main body of the image forming apparatus.

In addition, a section for supplying heat to the transparent protective layer of the transparent plate for a platen may be provided, and, for example, it is preferable to have a heating apparatus that heats the portion of the transparent protective layer which contacts an original document to be scanned transported by the document transporting portion. Specifically, it is preferable to dispose the heating apparatus at a position in the document transporting portion, which faces the portion at which the transparent protective layer of the transparent plate for a platen and the original document to be scanned contact each other.

Furthermore, it is also preferable to carry out a method of externally supplying heat, such as a method of applying hot air using a hot air blowing apparatus, such as a dryer, or a method of supplying friction heat by rubbing the surface of the transparent protective layer with a fabric or the like.

Further, in the method of supplying heat, it is preferable to heat the transparent protective layer to the temperature (self-repairability temperature) at which the transparent protective layer develops the self-repairability.

Further, from the viewpoint of suppressing deterioration of plastic parts (for example, an ABS resin) and the like which form the surrounding of the transparent plate for a platen in a document scanning apparatus, the heating temperature by the method of supplying heat is preferably 100° C. or lower.

—Coefficient of Kinetic Friction—

The transparent protective layer in the exemplary embodiment has a surface coefficient of kinetic friction with respect to copy paper of 0.7 or lower, more preferably 0.4 or lower, and particularly preferably 0.3 or lower. In addition, although not particularly limited, the lower limit value is preferably 0.01 or more.

When the transparent protective layer in the exemplary embodiment has a surface coefficient of kinetic friction with respect to copy paper in the above range, occurrence of scratches is suppressed even when friction with an original document to be scanned, foreign substances, or the like is caused on the surface of the transparent protective layer. In addition, the stick-slip phenomenon is suppressed, a slipping property with the original document to be scanned are obtained, and, in a case in which the transparent protective layer is applied to a document scanning apparatus having the document transporting portion, the original document to be scanned is favorably transported by the document transporting portion.

Method of Measuring the Surface Coefficient of Kinetic Friction with Respect to Copy Paper Further, the coefficient of kinetic friction is measured by the following method.

The coefficient of kinetic friction is measured according to JIS standard "Plastics—Film and sheeting—Determination of the coefficients of friction" (JISK7125 (1999)). That is, a coefficient of kinetic friction generated between the transparent protective layer placed on a horizontal cradle and copy paper (in the present measurement method, "color/monochrome paper C2 paper manufactured by Fuji Xerox Office Supply Co., Ltd." is used) fixed to the bottom surface of a block-shaped weight is measured. The friction force is measured when the contact portions with an area of 40 cm$^2$ (63 mm×63 mm) are pulled away at a rate of 100 mm/min (1.67 mm/sec) in the presence of load of 1.64 kPa (200 g), and the friction force is divided by vertical load by the weight so as to obtain a coefficient of kinetic friction. Since ordinary errors occur in measurement of the friction coefficient, the average value of five measurements is taken.

(Further, for the transparent protective layer having a large coefficient of kinetic friction, larger than 0.7, a phenomenon called the stick-slip phenomenon in which the friction is significantly changed on a periodic basis becomes liable to appear, and it is difficult to measure the coefficient of kinetic friction.)

The numeric values in the specification are measured by the above method.

Copy Paper

In the specification, the "copy paper" used as the original document to be scanned refers to high quality paper, recycled paper, gloss paper, coated paper, long paper, and the like which are used in printers or copiers, and indicates paper having a basis weight of 60 g/m² to 190 g/m².

Specific examples of the copy paper include C2 paper (manufactured by Fuji Xerox Office Supply Co., Ltd., color/monochrome paper): basis weight of 70 g/m², C2r paper (manufactured by Fuji Xerox Co., Ltd., color/monochrome recycled paper): basis weight of 70 g/m², J paper (manufactured by Fuji Xerox Co., Ltd., full color copier paper): basis weight of 82 g/m², E-A1 (manufactured by Fuji Xerox Co., Ltd., A1 roll paper, high quality paper): basis weight of 64 g/m², JDCOAT157 (manufactured by Fuji Xerox Co., Ltd., color copy/printer coated paper): basis weight of 95 g/m², EP label paper (manufactured by Fuji Xerox Co., Ltd., EP label paper, medium thickness): basis weight of 128 g/m², and the like.

Further, the coefficient of kinetic friction of the above listed copy paper with platen glass is measured according to JIS standard "Plastics—Film and sheeting—Determination of the coefficients of friction" (JISK7125 (1999)) (converted from the average values of five measurements), and the results are C2 paper: coefficient of kinetic friction=0.14, C2r paper: coefficient of kinetic friction=0.13, J paper: coefficient of kinetic friction=0.14, E-A1: coefficient of kinetic friction=0.13, and JTDCOAT157: coefficient of kinetic friction=0.07. In addition, the coefficient of kinetic friction tends to increase in a case in which sweat or the like from the human finger is attached to platen glass, but the coefficient of kinetic friction of the copy paper as shown above is 0.3 or less even in that case.

—Rupture Critical Stress—

The rupture critical stress of the transparent protective layer in the exemplary embodiment is preferably 21 kgf/mm² or more Here, the rupture critical stress is measured by the following method.

Using the continuous loading repeat switching type of a variable normal load friction and wear measurement system HEIDON TRIBOGEAR HHS2000 (manufactured by Shinto Scientific Co., Ltd.), a 30 mm-long scratches is made on the transparent protective layer at a rate of 1 mm/1 sec while the vertical load applied to the scratching needle (made of sapphire, radius of the front end r=0.01 mm) is increased from 0 g to 50 g, and friction resistance in the scanning direction, which is applied to the scratching needle, is monitored. It is found that the transparent protective layer is ruptured, that is, permanent damage is caused at the point in time at which the sliding scratching needle begins to irregularly vibrate as the scratching needle is scanned with an increasing load.

The load at the rupture threshold point is obtained from the obtained distance L at the rupture threshold point, and, furthermore, the stress at the rupture threshold point is computed. Further, the stress at this time is obtained from the value obtained by dividing the load by the area of the contact circle, but the radius r of the scratching needle is used so as to approximate the area of the contact circle to $\pi r^2$.

In a case in which a scratching test is carried out on platen glass, which is generally used in an image-scanning apparatus by the above method, there is a tendency toward causing fine damage when the stress is in a range of 21 kgf/mm² or more. Therefore, when the rupture critical stress of the transparent protective layer of the exemplary embodiment, which is formed on a transparent supporting member, such as platen glass, is 21 kgf/mm² or more, the effect of repairing fine damage by the self-repairability is favorably developed, rupture of the transparent protective layer, that is, occurrence of permanent damage is also effectively suppressed, and scratches are more favorably suppressed.

Further, the rupture critical stress of the transparent protective layer is more preferably 60 kgf/mm² or more, and particularly preferably 80 kgf/mm² or more.

Next, the configuration of the transparent plate for a platen will be described.

<Transparent Plate for a Platen>

—Transparent Supporting Member—

Examples of the transparent supporting member include a glass piece, an acryl plate, a polystyrene plate, a polycarbonate plate, and the like.

The thickness of the transparent supporting member is not particularly limited, but is preferably 1 mm to 10 mm.

—Transparent Protective Layer—

The transparent protective layer is formed on the transparent supporting member, has a self-repairability, and has a surface coefficient of kinetic friction with respect to copy paper in the above range.

Materials used for the transparent protective layer are not particularly limited as long as the materials satisfy the conditions of the self-repairability and the coefficient of kinetic friction. For example, a urethane resin formed by polymerizing an acryl resin and isocyanate, a urethane resin formed by polymerizing an acryl resin, silicone, and isocyanate, and the like are preferably used.

In the below, the urethane resin will be described as a representative example.

Urethane Resin

The acryl resin that composes the urethane resin is desirably an acryl resin having a hydroxyl group.

Regarding monomers for forming the acryl resin, firstly, examples of monomers having a hydroxyl group include (1) ethylenic monomers having a hydroxyl group, such as hydroxymethyl(meth)acrylate, hydroxyethyl(meth)acrylate, hydroxypropyl(meth)acrylate, hydroxybutyl(meth)acrylate, and N-methylol acrylamine. In addition, (2) ethylenic monomers having a carboxylic group, such as (meth)acrylic acid, crotonic acid, itaconic acid, fumaric acid, and maleic acid, may be used. Furthermore, as monomers not having a hydroxyl group, (3) ethylenic monomers that is copolymerizable with the monomers (1) and (2), such as alkyl(meth)acrylates including methyl(meth)acrylate, ethyl(meth)acrylate, propyl(meth)acrylate, butyl(meth)acrylate, n-propyl (meth)acrylate, n-butyl(meth)acrylate, isobutyl(meth)acrylate, 2-ethylhexyl(meth)acrylate, n-octyl(meth)acrylate, and n-dodecyl(meth)acrylate, may be jointly used.

Further, as the acryl resin, it is particularly preferable to use (a) an acryl resin for which the ratio of the molar quantity [A] of the monomer component containing side-chain hydroxyl group having less than 10 carbon atoms (short side-chain hydroxyl group) to the molar quantity [B] of the monomer component containing side-chain hydroxyl group having 10 or more carbon atoms (long side-chain hydroxyl group) ([A]/([A]+[B])) is 80% or more (including a case in which a side-chain hydroxyl group having 10 or more carbon atoms is not contained).

In addition, it is also preferable to use at least one of (a') acryl resins selected from compounds represented by the following general formula (1), for which the ratio of the molar quantity [A] of the monomer component containing side-chain hydroxyl group having less than 10 carbon atoms (short side-chain hydroxyl group) to the molar quantity [B] of the monomer component containing side-chain hydroxyl group having 10 or more carbon atoms (long side-chain hydroxyl group) ([A]/([A]+[B])) is 80% or more (including a case in which a side-chain hydroxyl group having 10 or more carbon atoms is not contained) and which contain silicone monomers. Further, at least one of the (a') acryl resins selected from compounds represented by the following general formula (1) may be used instead of the following silicone, or may be used jointly with the following silicone.

General Formula (1)

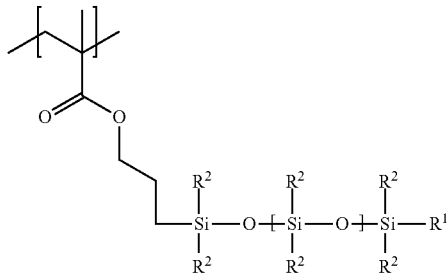

In the general formula (1), $R^1$ represents an amino group, a hydroxyl group, a methoxy group, or an ethoxy group, and $R^2$ represents a methyl group, a phenyl group, or an ethyl group. Further, the number (n) of groups in the parenthesis in —[Si$(R^2)_2$—O]— in the general formula (1) is not particularly limited, but is preferably 3 to 1000.

Furthermore, the ratio ([A]/([A]+[B])) is more preferably 90% or more.

In a case in which the acryl resin contains a long side-chain hydroxyl group, a monomer for forming the acryl resin is preferably a monomer obtained by attaching ε-caprolactone to 3 to 5 moles of hydroxymethyl(meth)acrylate.

The acryl resin may be used singly or in combination of two or more.

In addition, the acryl resin may contain a fluorine atom. The acryl resin containing a fluorine atom includes copolymers obtained by further polymerizing a monomer, such as 2-(perfluorobutyl)ethyl acrylate, 2-(perfluorohexyl)ethyl acrylate, 2-(perfluorohexyl)ethyl methacrylate, and perfluorohexyl ethylene.

The content of the fluorine atom is preferably 5% by mass to 50% by mass of the total urethane resin.

In the exemplary embodiment, the acryl resin is synthesized by mixing the monomer, causing ordinary radical polymerization, ion polymerization, or the like, and then purifying a polymer.

Silicone

In the exemplary embodiment, it is preferable to use at least one of (b) silicones selected from compounds represented by the following general formula (2) as the silicone.

General Formula (2)

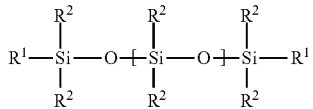

In the general formula (2), $R^1$ represents an amino group, a hydroxyl group, a methoxy group, or an ethoxy group, and $R^2$ represents a methyl group, a phenyl group, or an ethyl group. Further, the number (n) of groups in the parenthesis in —[Si$(R^2)_2$—O]— in the general formula (2) is not particularly limited, but is preferably 3 to 1000.

In addition, instead of using the silicone, at least one of the (a') acryl resins selected from the compounds represented by the general formula (1), which has a silicone chain at the side chain, may be used.

In the general formulae (1) and (2), $R^1$ represents an amino group, a hydroxyl group, a methoxy group, or an ethoxy group, and, among them, a hydroxyl group and a methoxy group are preferable.

$R^2$ represents a methyl group, a phenyl group, or an ethyl group, and, among them, a methyl group and a phenyl group are preferable.

The molecular weight (weight-average molecular weight) of the silicone (silicone monomer) bonded with the (a') acryl resin represented by the general formula (1) as the side chain, or the molecular weight (weight-average molecular weight) of the (b) silicone represented by the general formula (2) is preferably 250 to 50000, and more preferably 500 to 20000.

Specific examples of the silicone monomer bonded with the (a') acryl resin represented by the general formula (1) as the side chain include Silaplain FM-0771, FM-0721, FM-0725 (manufactured by Chisso Corp.), and the like. In addition, specific examples of the (b) silicone represented by the general formula (2) include KF9701, KF8008, KF6001 (manufactured by Shin-Etsu Chemical Co., Ltd.), TSR160, TSR145, TSR165, YF3804 (manufactured by Momentive Performance Materials Inc. in Japan), and the like.

Isocyanate

The (c) isocyanate that composes the urethane resin functions as a cross-linking agent that cross-links the acryl resin and the silicone, the acryl resins, or the silicones. The isocyanate is not particularly limited, but examples thereof that are preferably used include methylene diisocyanate, toluene diisocyanate, hexamethylene diisocyanate, isophorone diisocyanate, and the like. In addition, an isocyanurate-type, a burette-type, an adduct-type, and the like, which are multimeric complexes of hexamethylene diisocyanate, may be used. The isocyanate may be only one kind or two or more kinds. Furthermore, an isocyanate for which functional groups are blocked so as not to react until a specific temperature may be used.

Further, the ratio (i)/(ii) of the content (i) of the isocyanate to the amount (ii) of the hydroxyl group in the acryl resin is preferably 0.1 to 3, and more preferably 0.5 to 1.

Method of Forming the Transparent Protective Layer

Next, an exemplary embodiment in which the urethane resin is applied will be described as an example of the method of forming the transparent protective layer in the exemplary embodiment.

For example, in a case in which the components (a), (b), and (c) are polymerized, (a) the acryl resin, (b) the silicone, and (c) the isocyanate are mixed, defoamed under reduced pressure, then, cast on a transparent supporting member, and heated (for example, one hour at 85° C. or one hour at 180° C.) so as to be cured.

In addition, in a case in which a blocked isocyanate is used, the mixture is heated to a temperature at which the blocks are unblocked or higher so as to be cured. In addition, the transparent protective layer can be formed by a method in which ultrasonic waves are used instead of defoaming under reduced pressure, a rotary mixer using a centrifugal force is used, the mixed fluid is left to stand so as to be defoamed, and the like.

In addition, the transparent protective layer can be formed by polymerizing at least one of the (a') acryl resins selected from compounds represented by the general formula (1) and the (c) isocyanate.

Control of Self-Repairability

The numeric value of the restoration rate is controlled to the above range, that is, the transparent protective layer having a self-repairability is formed by controlling the amount of the long side-chain hydroxyl group, the amount of the short side-chain hydroxyl group, the amount of the (b) silicone, the amount of the silicone chain in the (a') acryl resin, the kind and amount of the cross-linking agent, and the like in a case in which a urethane resin is polymerized using compositions represented by the (a), (b), and (c) or compositions represented by the (a') and (c). For example, when the crosslink density is increased, the restoration rate tends to be increased.

Control of the Coefficient of Kinetic Friction

In addition, the numeric value of the coefficient of kinetic friction is controlled to the above range by a method in which the hardness of the transparent protective layer is adjusted by adjustment of the crosslink density, or controlling the amount of fluorine atoms in the acryl resin, the amount of silicone, and the like in a case in which a urethane resin is polymerized using compositions represented by the (a), (b), and (c) or compositions represented by the (a') and (c).

The thickness of the transparent protective layer formed on the transparent supporting member is not particularly limited, but is preferably 1 μm to 500 μm, and more preferably 10 μm to 50 μm.

<Document Scanning Apparatus and Image Forming Apparatus>

Next, the document scanning apparatus and the image forming apparatus of the exemplary embodiment will be described with reference to the accompanying drawings.

FIG. 1 shows an electrophotographic image forming apparatus having a document scanning apparatus as an example of the exemplary embodiment.

The image forming apparatus 10 includes a paper accommodation portion 12 that extends from the bottom side to the top side in the vertical direction (in the arrow V direction) and contains recording paper P, an image forming portion 14 that is provided on the paper accommodation portion 12 and forms images on the recording paper P which is supplied from the paper accommodation portion 12 and is an example of a recording medium, a document scanning apparatus 16 that scans an original document to be scanned G provided on the image forming portion 14, and a control portion 20 that is provided in the image forming portion 14 and controls operations of the respective portions in the image forming apparatus 10. Further, in the following description, the vertical direction of the apparatus main body 10A of the image forming apparatus 10 is indicated by the arrow V direction, and the horizontal direction is indicated by the arrow H direction.

Paper Accommodation Portion

The paper accommodation portion 12 is provided with a first containing portion 22, a second containing portion 24, and a third containing portion 26, which contain the recording paper P of different sizes. The first containing portion 22, the second containing portion 24, and the third containing portion 26 are provided with a delivery roll 32 that delivers the contained recording paper P to a transport path 28 provided in the image forming apparatus 10, and are respectively provided with a pair of transporting rolls 34 and a transporting roll 36 that transport the recording papers P one by one on the downstream side of the delivery roll 32 in the transport path 28. In addition, a locating roll 38 that temporarily stops the recording paper P and delivers the recording paper to a secondary transfer position as described below at a determined timing is provided on the downstream side of the transporting roll 36 in the recording paper P transport direction in the transport path 28.

On the front view of the image forming apparatus 10, the upstream portion of the transport path 28 is linearly provided from the left side of the paper accommodation portion 12 to the bottom left side of the image forming portion 14 in the arrow V direction. In addition, the downstream side of the transport path 28 is provided from the bottom left side of the image forming portion 14 to a paper ejecting portion 15 provided on the right side surface of the image forming portion 14. Furthermore, a duplex transporting portion 29 that transports and reverses the recording paper P to form images on the both surfaces of the recording paper P is connected to the transport path 28.

On the front view of the image forming apparatus 10, the duplex transport path 29 has a first switching member 31 that switches the transport path 28 and the duplex transport path 29, a reverse portion 33 that is linearly provided from the bottom right side of the image forming portion 14 to the right side of the paper accommodation portion 12 in the arrow V direction (the downward direction is indicated by −V, and the upward direction is indicated by +V in the drawing), a transporting portion 37 in which the rear end of the recording paper P transported to the reverse portion 33 is entered and transported to the left side of the drawing in the arrow H direction, and a second switching portion 35 that switches the reverse portion 33 and the transporting portion 37. In addition, the reverse portion 33 is provided with a pair of transporting rolls 42 with an interval therebetween at plural positions, and the transporting portion 37 is provided with a pair of transporting rolls 44 with an interval therebetween at plural positions.

The first switching member 31 is a triangular prism member, and switches the transport direction of the recording paper P by moving the front end portion to either the transport path 28 or the duplex transport path 29 using a driving section (not shown). Similarly, the second switching member 35 is a triangular prism member on the front view, and switches the transport direction of the recording paper P by moving the front end portion to either the reverse portion 33 or the transporting portion 37 using a driving section which is not shown. Further, the downstream side end portion of the transporting portion 37 is connected to the immediate front side of the transporting roll 36 present in the upstream side portion of the transport path 28 by a guiding member (not shown). In addition, a folding-type manual paper feeding portion 46 is provided on the left side surface of the image forming portion 14, and the transport path of the recording paper P delivered from the manual paper feeding portion 46 is connected to the immediate front of the locating roll 38 in the transport path 28.

Document Scanning Apparatus

The document scanning apparatus 16 is provided with a document feeding apparatus (document feeding portion) 52 that automatically feeds original documents to be scanned G one by one, a transparent plate for placed-original-document-scanning platens 54A as an example of an original document placing table which is disposed on the lower side of the document feeding apparatus 52, and on which one original document to be scanned G is placed, a transparent plate for transported-original-document-scanning platens 54B which is disposed on the lower side of the document feeding apparatus 52, and disposed so that the scan surface side of one original document to be scanned G transported by the document feeding apparatus 52 contacts the transparent plate, and a document scanning portion 56 as an example of a scanning section that scans the original document to be scanned G fed by the document feeding apparatus 52 or the original document to be scanned G placed on the transparent plate for placed-original-document-scanning platens 54A from the opposite side of the transparent plate for transported-original-document-scanning platens 54B or the opposite side of the transparent plate for placed-original-document-scanning platens 54A. Further, in the exemplary embodiment, the transparent plate for a platen according to the exemplary embodiment is used as the transparent plate for transported-original-document-scanning platens 54B or the transparent plate for placed-original-document-scanning platens 54A.

The document feeding apparatus 52 has an automatic feed path 55 along which plural pairs of feed rolls 53 are disposed, a part of the automatic feed path 55 is disposed so that the original document to be scanned G passes through on the transparent plate for transported-original-document-scanning platens 54B. In addition, the document scanning portion 56 scans the original document to be scanned G transported by the document feeding apparatus 52 in a state of remaining still below the transparent plate for transported-original-document-scanning platens 54B, or moves in the arrow H direction and scans the original document to be scanned G placed on the transparent plate for placed-original-document-scanning platens 54A.

Further, the document scanning apparatus 16 more preferably has a heating apparatus 57 for heating a portion of the transparent protective layer in the transparent plate for transported-original-document-scanning platens 54B, which contacts the original document to be scanned G transported by the document feeding apparatus 52. In addition, a heating apparatus for heating a portion of the transparent plate for placed-original-document-scanning platens 54A, which contacts the original document to be scanned G may also be provided.

As the heating apparatus 57, for example, a contact or non-contact heating apparatus having a heating mechanism using an electrically-heated wire heater, a halogen lamp, or the like, a mechanism using electromagnetic induction heating or sending hot air using electromagnetic induction heating, or the like can be used.

Operation Panel

Figure 2:
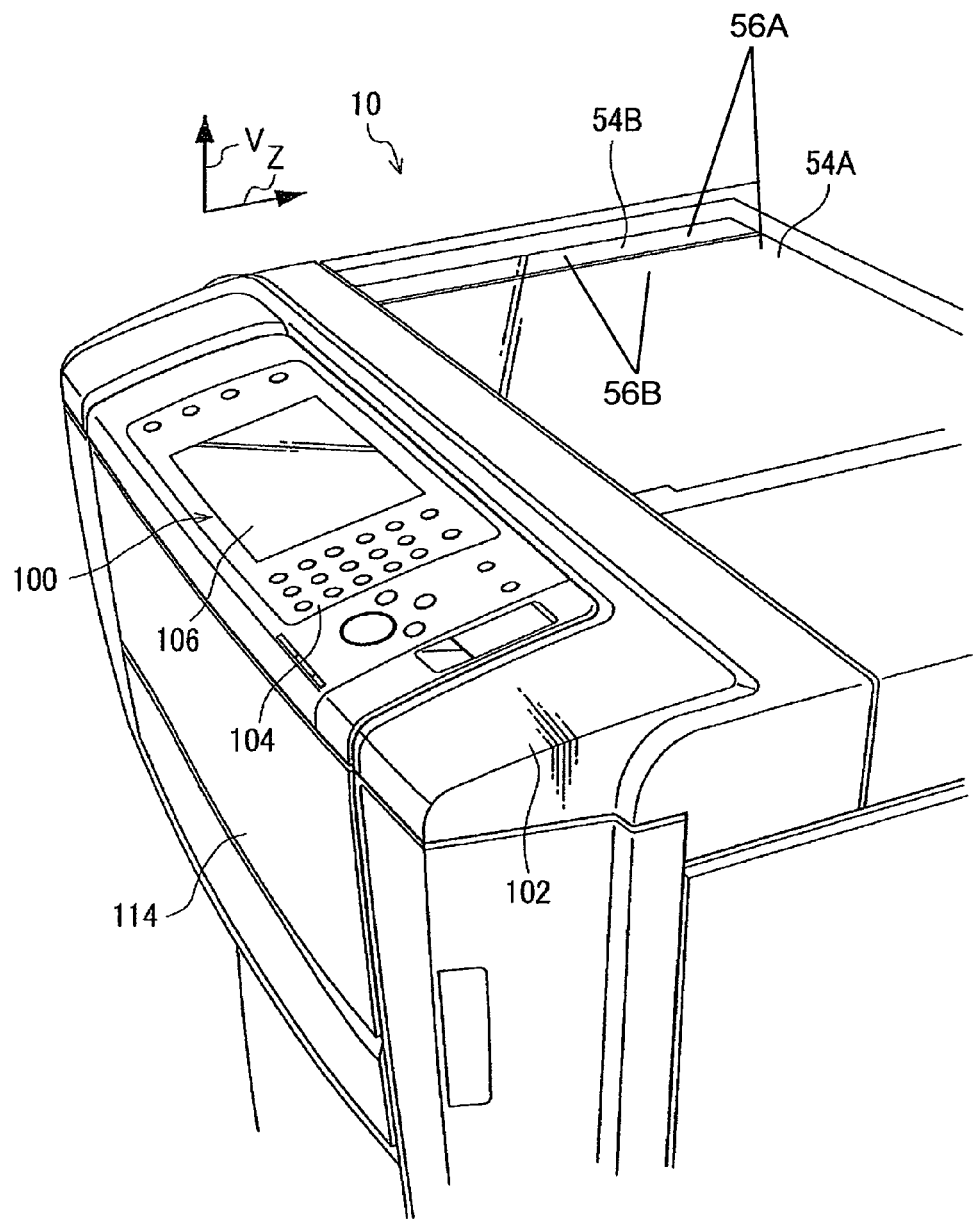
FIG. 2 is a perspective view of a transparent plate for a platen and an operation panel in the image forming apparatus according to the exemplary embodiment.

As shown in FIG. 2, an operation panel is provided on the immediate front side of the transparent plate for a platen (the transparent plate for placed-original-document-scanning platens 54A and the transparent plate for transported-original-document-scanning platens 54B) in the arrow Z direction in the image forming apparatus 10 as an example of an operation portion operated by an operator. The platens 54A and 54B each include a transparent supporting member 56A and a transparent protective layer 56B.

The operation panel 100 includes an operation button portion 104 and a display panel 106, and the operation button portion 104 and the display panel 106 are exposed on the top surface of a platen cover 102, which is an example of a plate material attached to the top surface of the apparatus main body 10A. That is, the platen cover 102 forms the outer frame of the operation panel 100. In addition, the operation button portion 104 is provided with plural buttons or numerical keypads through which a variety of operation instructions, such as a copy operation, are inputted, and the display panel 106 displays a variety of messages, such as setting of operation conditions and operation states. In addition, the operation panel 100 is disposed on a side of the transparent plates for platens 54A and 54B at which the operator does operations. Further, the display panel 106 may be a touch panel with which settings are changed through a touch by the operator.

Image Forming Portion

The image forming portion 14 has an image forming unit 50 as an example of the image forming portion that forms images using toners (developers) provided below the document scanning apparatus 16. The image forming unit 50 includes a photoreceptor 62 as described below, a charging member 64, an exposure apparatus 66, a developing apparatus 72, a transfer unit 70, and a cleaning apparatus 73. In addition, the transfer unit 70 includes an intermediate transfer belt 68 as described below, a primary transfer roll 67, an auxiliary roll 69, and a secondary transfer roll 71.

The cylindrical photoreceptor 62, which is a latent image-holding body, is provided at the center of the apparatus main body 10A in the image forming portion 14. The photoreceptor 62 is rotated by a driving section (not shown) in the arrow +R direction (the clockwise direction in the drawing), and holds an electrostatic latent image formed by light irradiation. In addition, the corotron-type charging member 64 that charges the surface of the photoreceptor 62 is provided on the top side of the photoreceptor 62 and a position facing the outer circumferential surface of the photoreceptor 62.

The exposure apparatus 66 is provided at a position facing the outer circumferential surface of the photoreceptor 62 on the downstream side of the charging member 64 in the rotation direction of the photoreceptor 62. The exposure apparatus 66 has semiconductor laser, not shown, an f-θ lens, a polygon mirror, an imaging lens, and plural mirrors. The exposure apparatus deflects and scans laser rays ejected from the semiconductor laser based on image signals using the polygon mirror, and irradiates (exposes) the laser rays to the outer circumferential surface of the photoreceptor 62 charged by the charging member 64, thereby forming an electrostatic latent image. Further, the exposure apparatus 66 is not limited to a type in which laser rays are deflected and scanned by the polygon mirror, and may be the light emitting diode (LED) type or the like.

The rotary switching-type developing apparatus 72 that develops and visualizes the electrostatic latent image formed on the outer circumferential surface of the photoreceptor 62 using toners of determined colors is provided on the downstream side of a portion at which exposed light of the exposure apparatus 66 is irradiated in the rotation direction of the photoreceptor 62.

The developing apparatus 72 has six developers (no reference signs) corresponding to the respective toner colors of yellow (Y), magenta (M), cyan (C), black (K), a first special color (F), and a second special color (F) disposed in an array in the circumferential direction (in the above order in the counterclockwise direction in the drawing), is rotated by a motor (not shown) at 60° intervals in terms of the central angle so as to switch the respective developers that carry out developing treatments, and faces the outer circumferential surface of the photoreceptor 62. Further, in a case in which an image of four colors of Y, M, C, and K is formed, the first special color (F) and the second special color (F) are not used, and therefore the rotation angle from the developer corresponding to K to the developer corresponding to Y becomes 180°.

The respective developers are filled with developers (not shown) composed of a toner and a carrier which are supplied from toner cartridges 78Y, 78M, 78C, 78K, 78K, and 78F, which is an example of a supplying portion, provided below the document scanning apparatus 16 through toner supplying paths (not shown). In addition, each of the developers is provided with a developing roll 74 having the outer circumferential surface facing the outer circumferential surface of the photoreceptor 62. The developing roll 74 is composed of a cylindrical developing sleeve rotatably provided and a magnetic member composed of plural magnetic poles fixed to the inside of the developing sleeve. In addition, in the developing apparatus 72, the developing sleeve is rotated so as to form magnetic brush of the developer (carrier), and toner corresponding to a latent image (electrostatic latent image) formed on the outer circumferential surface of the photoreceptor 62 are attached, thereby carrying out developing. Further, the toner cartridges 78E and 78F are filled with, for example, toners that are lighter than Y, M, and C.

Meanwhile, the transfer unit 70 is provided with the intermediate transfer belt 68 to which toner images formed on the outer circumferential surface of the photoreceptor 62 are transferred. The intermediate transfer belt 68 is an endless belt, and is disposed on the downstream side of the developing apparatus 72 in the rotation direction of the photoreceptor 62 and on the lower side of the photoreceptor 62. In addition, the intermediate transfer belt 68 is supported by a driving roll 61 rotary-driven by the control portion 20, a tension-supplying roll 65 for supplying tension to the intermediate transfer belt 68, plural transporting rolls 63 that contacts the rear surface of the intermediate transfer belt 68 and are driven to rotate, and an auxiliary roll 69 that contacts the rear surface of the intermediate transfer belt 68 and is driven to rotate at a secondary transfer position as described below. In addition, the intermediate transfer belt 68 is moved around in the arrow −R direction (the counterclockwise direction in the drawing) by rotation of the driving roll 61.

In addition, the primary transfer roll 67 that primarily transfers toner images formed on the outer circumferential surface of the photoreceptor 62 to the intermediate transfer belt 68 is provided opposite to the photoreceptor 62 with the intermediate transfer belt 68 therebetween. The primary transfer roll 67 is in contact with the rear surface of the intermediate transfer belt 68 at a position away from the position at which the photoreceptor 62 and the intermediate transfer belt 68 contact with each other (this position will be considered as the primary transfer position) on the downstream side in the moving direction of the intermediate transfer belt 68. In addition, the primary transfer roll 67 is made to flow electric current from a power supply (not shown) so as to primarily transfer toner images on the photoreceptor 62 to the intermediate transfer belt 68 using the potential difference with the grounded photoreceptor 62.

Furthermore, the secondary transfer roll 71 that secondarily transfers the toner images primarily transferred to the intermediate transfer belt 68 to the recording paper P is provided opposite to the auxiliary roll 69 with the intermediate transfer belt 68 therebetween, and a secondary transfer position at which the toner images are transferred to the recording paper P is formed between the secondary transfer roll 71 and the auxiliary roll 69. The secondary transfer roll 71 is grounded and in contact with the surface of the intermediate transfer belt 68, and secondarily transfers the toner images on the intermediate transfer belt 68 to the recording paper P using the potential difference between the auxiliary roll 69 which is made to flow electric current from the power supply (not shown) and the secondary transfer roll 71.

In addition, a cleaning blade 59 that collects residual toners after the secondary transfer of the intermediate transfer belt 68 is provided opposite to the driving roll 61 with the intermediate transfer belt 68 therebetween. The cleaning blade 59 is attached to a chassis (not shown) having an opening portion, and toners collected at the front end portion of the cleaning blade 59 are collected in the chassis.

A position detecting sensor 83 that detects marks (not shown) attached to the surface of the intermediate transfer belt 68 so as to detect the predetermined standard position on the intermediate transfer belt 68 and output a position-detecting signal which becomes the standard of the starting timing of an image forming treatment is provided at a position opposite to the transporting roll 63 around the intermediate transfer belt 68. The position detecting sensor 83 irradiates light toward the intermediate transfer belt 68 and receives light reflected on the surface of the mark so as to detect the moving position of the intermediate transfer belt 68.

Meanwhile, the cleaning apparatus 73 that cleans residual toners and the like that are not primarily transferred to the intermediate transfer belt 68 and remain on the surface of the photoreceptor 62 is provided on the downstream side of the primary transfer roll 67 in the rotation direction of the photoreceptor 62. The cleaning apparatus 73 is configured to collect residual toners and the like using the cleaning blade and a brush roll that contact the surface of the photoreceptor 62.

In addition, a corotron 81 that neutralizes toners charge remaining on the outer circumferential surface of the photoreceptor 62 after the primary transfer is provided on the upstream side (on the downstream side of the primary transfer roll 67) of the cleaning apparatus 73 in the rotation direction of the photoreceptor 62. Furthermore, an erasing apparatus 75 that irradiates light to the outer circumferential surface of the photoreceptor 62 after the cleaning so as to carry out erasing the charge is provided on the downstream side (the upstream side of the charging member 64) of the cleaning apparatus 73 in the rotation direction of the photoreceptor 62.

In addition, the secondary transfer position of toner images by the secondary transfer roll 71 is set in the middle of the above transport path 28, and a fixing apparatus 90 that fixes toner images on the recording paper P to which the toner images is transferred by the secondary transfer roll 71 is provided on the downstream side of the secondary transfer roll 71 in the transport direction (the arrow A direction in the drawing) of the recording paper P in the transport path 28. The fixing apparatus 90 has a fixing roll 92 that fixes toner images by heating, and a pressure roll 94 that presses the recording paper P toward the fixing roll 92. Further, a transporting roll 39 that transports the recording paper P toward the paper ejecting portion 15 or the reverse portion 33 is provided on the downstream side of the fixing apparatus 90 in the transport direction of the recording paper P in the transport path 28.

EXAMPLES

Hereinafter, the invention will be described in detail with examples, but the invention is not limited to the examples as described below. Further, hereinafter, "parts" and "%" are based on mass unless otherwise described.

Example 1

Manufacturing of the Transparent Plate for a Platen

A transparent protective layer is formed on a glass platen for scanning transported original documents (manufactured by Asahi Glass Co., Ltd., 367 mm×30 mm, thickness 1.8 mm) by the following method.

[Method of Preparing Samples]
<Synthesis of Acryl Resin Prepolymer A1>

Hydroxyethyl methacrylate which is a monomer that becomes a short side-chain hydroxyl group (HEMA, the number of carbon atoms at the side-chain hydroxyl group: 3): 182 parts CHEMINOX FAMAC6 (manufactured by Unimatec Corporation, 2-(perfluorohexyl)ethyl methacrylate, a fluorine atom is included): 151 parts Silaplain FM-0721 (manufactured by Chisso Corp., butyl (3-methacryloxypropyl)polydimethylsiloxane, silicon is included): 100 parts PLACCEL FM3 which is a monomer that becomes a long side-chain hydroxyl group (manufactured by Daicel Chemical industries Ltd., lactone-modified methacrylate, the number of carbon atoms at the side-chain hydroxyl group: 21): 165 parts Polymerization initiator (benzoyl peroxide, BPO): 27 parts
Butyl acetate: 60 parts A monomer solution composed of the above components is fed in a dropping funnel, and dropped in 300 parts of butyl acetate that is heated to 110° C. under nitrogen reflux for 3 hours while being stirred so as to be polymerized. Furthermore, a liquid composed of 135 parts of butyl acetate and 3 parts of BPO is dropped for one hour, and the reaction is finished. Further, the solution is constantly held at 110° C. and continuously stirred during the reaction. An acryl resin prepolymer A1 is synthesized in the above manner.

<Formation of Transparent Plate for a Platen B1>

The following liquid A and the following liquid B are mixed in the following ratio, and then defoamed under reduced pressure for 10 minutes. This liquid is cast on the glass platen for scanning transported original documents, cured at 80° C. for one hour and, furthermore, 180° C. for one hour, thereby manufacturing a transparent plate for a platen B1 having a 40 μm-thick transparent protective layer.

Liquid A (the acryl resin prepolymer A1 liquid 45.7%, hydroxyl valence 164): 153 parts Liquid B (isocyanate, manufactured by Asahi Kasei Chemicals Corporation, DURANATE X1040, compound name: polyisocyanurate body of hexamethylene diisocyanate): 76 parts Example 2

Synthesis of Acryl Resin Prepolymer A2

An acryl resin prepolymer A2 is synthesized by the method in Example 1 except that 142 parts of hydroxyethyl methacrylate (HEMA), 135 parts of FAMAC6, and 221 parts of PLACCEL FM3 are used in the <Synthesis of acryl resin prepolymer A1> of Example <Formation of Transparent Plate for a Platen B2>

A transparent plate for a platen B2 having a transparent protective layer is manufactured by the method in Example 1 except that 150 parts of the acryl resin prepolymer A2 liquid (46.5%, hydroxyl valence 147) is used instead of 153 parts of the acryl resin prepolymer A1 liquid, and the liquid B is changed to 67 parts in the <Formation of transparent plate for a platen B1> of Example 1.

Example 3

Synthesis of Acryl Resin Prepolymer A3

An acryl resin prepolymer A3 is synthesized by the method in Example 1 except that 110 parts of hydroxyethyl methacrylate (HEMA), 122 parts of FAMAC6, and 267 parts of PLACCEL FM3 are used in the <Synthesis of acryl resin prepolymer A1> of Example 1.

<Formation of Transparent Plate for a Platen B3>

A transparent plate for a platen 53 having a transparent protective layer is manufactured by the method in Example 1 except that 151 parts of the acryl resin prepolymer A3 liquid (46.3%, hydroxyl valence 132) is used instead of 153 parts of the acryl resin prepolymer A1 liquid, and the liquid B is changed to 61 parts in the <Formation of transparent plate for a platen B1> of Example 1.

Example 4

Formation of Transparent Plate for a Platen B4

A transparent plate for a platen B4 having a transparent protective layer is manufactured by the method in Example 3 except that the acryl resin prepolymer A3 liquid is changed from 151 parts to 172 parts, the liquid B is changed from 61 parts to 63 parts, and, furthermore, 13 parts of a liquid C as shown below is added in the <Formation of transparent plate for a platen B3> of Example 3.

Liquid C (isocyanate, manufactured by Asahi Kasei Chemicals Corporation, DURANATE E402-B80, compound name: adduct body of polyisocyanate)

Example 5

Formation of Transparent Plate for a Platen B5

A transparent plate for a platen B5 having a transparent protective layer is manufactured by the method in Example 3 except that the acryl resin prepolymer A3 liquid is changed from 151 parts to 172 parts, the liquid B is changed from 61 parts to 56 parts, and, furthermore, 26 parts of the liquid C is added in the <Formation of transparent plate for a platen B3> of Example 3.

Example 6

Formation of Transparent Plate for a Platen B6

A transparent plate for a platen B6 having a transparent protective layer is manufactured by the method in Example 3 except that the acryl resin prepolymer A3 liquid is changed from 151 parts to 172 parts, the liquid B is changed from 61 parts to 49 parts, and, furthermore, 39 parts of the liquid C is added in the <Formation of transparent plate for a platen B3> of Example 3.

Example 7

Synthesis of Acryl Resin Prepolymer A7

An acryl resin prepolymer A7 is synthesized by the method in Example 1 except that 212 parts of hydroxyethyl acrylate (HEA) is used instead of hydroxyethyl methacrylate (HEMA), 191 parts of FAAC6 (manufactured by Unimatec Corporation, compound name: 2-(perfluorohexyl)ethyl acrylate, a fluorine atom is included) is used instead of FAMAC6, and 95 parts of isobornyl methacrylate (IBXA) is used instead of PLACCEL FM3 in the <Synthesis of acryl resin prepolymer A1> of Example 1.

<Formation of Transparent Plate for a Platen B7>

A transparent plate for a platen B7 having a transparent protective layer is manufactured by the method in Example 1 except that 212 parts of the acryl resin prepolymer A7 liquid (47.0%, hydroxyl valence 171) is used instead of 153 parts of the acryl resin prepolymer A1 liquid, and 48 parts of DURANATE TPA-B80 (manufactured by Asahi Kasei Chemicals Corporation, compound name: polyisocyanurate adduct body of hexamethylene diisocyanate) is used instead of the liquid B in the <Formation of transparent plate for a platen B1> of Example 1.

Example 8

Synthesis of Acryl Resin Prepolymer A8

An acryl resin prepolymer A8 is synthesized by the method in Example 1 except that 100 parts of hydroxyethyl methacrylate (HEMA), 399 parts of FAMAC, and 0 parts of PLACCEL FM3 are used in the <Synthesis of acryl resin prepolymer A1> of Example 1.
<Formation of Transparent Plate for a Platen B8>
A transparent plate for a platen B8 having a transparent protective layer is manufactured by the method in Example 1 except that 108 parts of the acryl resin prepolymer A8 liquid (46.2%, hydroxyl valence 216) is used instead of 153 parts of the acryl resin prepolymer A1 liquid, and 132 parts of the liquid C is used instead of the liquid B in the <Formation of transparent plate for a platen B1> of Example 1.

Example 9

Formation of Transparent Plate for a Platen B9

A transparent plate for a platen B9 having a transparent protective layer is manufactured by the method in Example 1 except that 259 parts of the acryl resin prepolymer A8 liquid (46.2%, hydroxyl valence 216), which is synthesized in Example 8, is used instead of 153 parts of the acryl resin prepolymer A1 liquid, and the liquid B is changed to 172 parts in the <Formation of transparent plate for a platen B1> of Example 1.

Comparative Example 1

Preparation of Transparent Plate for a Platen B10

A glass platen (manufactured by Asahi Glass Co., Ltd., 367 mm×30 mm, thickness 1.8 mm) is used as a transparent plate for a platen, and a transparent plate for a platen B10 having no transparent protective layer is prepared.
On the transparent plate for a platen B10, load evaluation by a scratching needle of HEIDON TRIBOGEAR as described below is used, and evaluation of occurrence of fine scratches, which is not easily visually confirmed, is carried out using a stereoscopic microscope.
In addition, on the transparent plate for a platen B10, load evaluation by a scratching needle of HEIDON TRIBOGEAR as described below is used, and evaluation of occurrence of white scratches, which is easily visually confirmed, is carried out.

Comparative Example 2

Synthesis of Acryl Resin Prepolymer A11

An acryl resin prepolymer A11 is synthesized by the method in Example 1 except that 32 parts of hydroxyethyl methacrylate (HEMA), 327 parts of FAMAC6, 238 parts of PLACCEL FM3, and 0 part of Silaplain FM-0721 are used in the <Synthesis of acryl resin prepolymer A1> of Example 1.
<Formation of Transparent Plate for a Platen B11>
A transparent plate for a platen B11 having a transparent protective layer is manufactured by the method in Example 1 except that 267 parts of the acryl resin prepolymer A11 liquid (44.3%, hydroxyl valence 71) is used instead of 153 parts of the acryl resin prepolymer A1 liquid, and the liquid B is changed to 56 parts in the <Formation of transparent plate for a platen B1> of Example 1.

Comparative Example 3

Formation of Transparent Plate for a Platen B12

A transparent plate for a platen B12 having a transparent protective layer is manufactured by the method in Example 2 except that 48 parts of DURANATE D201 (manufactured by Asahi Kasei Chemicals Corporation, compound name: difunctional-type polyisocyanate) is used instead of the liquid B in the <Formation of transparent plate for a platen B2> of Example 2.

Comparative Example 4

Formation of Transparent Plate for a Platen B13

A transparent plate for a platen B13 is manufactured by adhering PET (polyethylene terephthalate, thickness 75 μm, an adhesive layer is present) as the transparent protective layer to the glass platen for scanning transported original documents (manufactured by Asahi Glass Co., Ltd., 367 mm×30 mm, thickness 1.8 mm).

Comparative Example 5

Formation of Transparent Plate for a Platen B14

A transparent plate for a platen B14 is manufactured by adhering PFA (tetrafluoroethylene, thickness 75 μm, an adhesive layer is present) as the transparent protective layer to the glass platen for scanning transported original documents (manufactured by Asahi Glass Co., Ltd., 367 mm×30 mm, thickness 1.8 mm).
—Measurement of the Restoration Rate—
The restoration rate of the transparent protective layer is obtained by the above method in which FISCHERSCOPE HM2000 (manufactured by Fischer Instruments K.K.) is used as a measuring apparatus. The restoration rates and temperatures at which the restoration rates appear (termed "damage repair temperature" in the following tables 1 and 2) are shown in Tables 1 and 2.
The restoration rates are measured at the damage repair temperatures as shown in Tables 1 and 2, and measured at 170° C. in Comparative Examples 4 and 5.
—Measurement of the Coefficient of Kinetic Friction—
The surface coefficient of kinetic friction with respect to copy paper is obtained by the above method. The obtained results of the coefficients of kinetic friction are shown in Tables 1 and 2.
[Evaluation]
—Measurement of Rupture Threshold—
The distance from the rupture threshold point L, the load at the rupture threshold point, and the rupture critical stress are measured by the following method.
A continuous loading repeat switching type of a variable normal load friction and wear measurement system HEIDON TRIBOGEAR HHS2000 (manufactured by Shinto Scientific Co. Ltd.) is used. A 30 mm-long scratches is made on the transparent protective layer (a glass platen in Comparative Example 1) at a rate of 1 mm/1 sec while the vertical load applied to the scratching needle (made of sapphire, radius of the front end r=0.01 mm) is increased from 0 g to 50 g, and friction resistance in the scanning direction, which is applied to the scratching needle, is monitored. It is found that the transparent protective layer is ruptured, that is, permanent damage is caused at a point in time at which the sliding scratching needle begins to irregularly vibrate as the scratching needle is scanned with an increasing load.

The load at the rupture threshold point is obtained from the obtained distance L at the rupture threshold point, and, furthermore, the stress at the rupture threshold point is computed. Further, the stress at this time is obtained from the value obtained by dividing the load by the area of the contact circle, but the radius r of the scratching needle is used so as to approximate the area of the contact circle to $\pi r^2$.

The results are shown in Tables 1 and 2.

—Evaluation of Original Document Transporting Property—

The transporting property at the contact portion of the original document to be scanned with the transparent plate for a platen is evaluated by the following method.

The transparent plates for platens of Examples and Comparative Examples are installed in an electrophotographic image forming apparatus (manufactured by Fuji Xerox Co., Ltd., DocuCentre Color f450) as a platen for scanning transported original documents, an A4 sheet of copy paper (C2 paper, manufactured by Fuji Xerox Office Supply Co., Ltd., color/monochrome paper) is transported in the document scanning apparatus, and the original document transporting property is evaluated based on whether the paper jam sensor is operated (no paper jam: "B," paper jam present: "D").

The results are shown in Tables 1 and 2.

—Comprehensive Evaluation—

Comprehensive evaluation is made based on the following evaluation criterion.

A: no paper jam occurs, the rupture critical stress is 100 kgf/mm² or more, and the damage repair temperature is 100° C. or lower.

B: no paper jam occurs, the rupture critical stress is 21 kgf/mm² to less than 100 kgf/mm², and the damage repair temperature is 100° C. or lower.

C: no paper jam occurs, the rupture critical stress is 21 kgf/mm² to less than 100 kgf/mm², and the damage repair temperature exceeds 100° C.

D: Paper jam error occurs, or damage is not repaired even when heated at 170° C.

TABLE 1

| | Examples | | | | | | | | |
|---|---|---|---|---|---|---|---|---|---|
| | 1 | 2 | 3 | 4 | 5 | 6 | 7 | 8 | 9 |
| Transparent protective layer | Present | Present | Present | Present | Present | Present | Present | Present | Present |
| Restoration rate of transparent protective layer [%] | 88 | 93 | 94 | 96 | 95 | 98 | 94 | 94 | 93 |
| Damage repair temperature of transparent protective layer [° C.] | 80 | 70 | 50 | 40 | 35 | 30 | 90 | 20 | 120 |
| Coefficient of kinetic friction with respect to paper | 0.21 | 0.17 | 0.11 | 0.18 | 0.45 | 0.61 | 0.52 | 0.65 | 0.22 |
| Distance from rupture threshold point L [mm] | 20.6 | 20.8 | 19.4 | 19.2 | 15.5 | 14.2 | 14.5 | 13.3 | 16.1 |
| Load at rupture threshold point [gf] | 34.3 | 34.6 | 32.3 | 32 | 25.8 | 23.2 | 24.1 | 21.7 | 26.8 |
| Rupture critical stress [kgf/mm²] | 109 | 110 | 103 | 102 | 82 | 75 | 77 | 70 | 85 |
| Evaluation of original document transporting property | B | B | B | B | B | B | B | B | B |
| Comprehensive evaluation | A | A | A | A | B | B | B | B | C |

TABLE 2

| | Comparative Examples | | | | |
|---|---|---|---|---|---|
| | 1 | 2 | 3 | 4 | 5 |
| Transparent protective layer | Absent | Present | Present | Present | Present |
| Restoration rate of transparent protective layer [%] | — | 91 | 96 | 49 | 65 |
| Damage repair temperature of transparent protective layer [° C.] | — | 10 | 10 or less | Damage not repaired | Damage not repaired |
| Coefficient of kinetic friction with respect to paper | | 0.14 | 0.75 or more | 1 or more | 0.35 | 0.14 |
| Distance from rupture threshold point L [mm] | 4 (fine damage) | 20 (white damage) | 12.3 | 9.6 | 13.6 | Not ruptured |
| Load at rupture threshold point [gf] | 6.5 | 33.3 | 20.5 | 15.6 | 22.6 | — |
| Rupture critical stress [kgf/mm²] | 21 | 106 | 65 | 51 | 72 | — |

TABLE 2-continued

| | Comparative Examples | | | | |
|---|---|---|---|---|---|
| | 1 | 2 | 3 | 4 | 5 |
| Evaluation of original document transporting property | B | D | D | B | B |
| Comprehensive evaluation | D | D | D | D | D |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A transparent plate for a platen which is used in a document scanning apparatus, comprising:
   a transparent supporting member; and a transparent protective layer that has a temperature-based self-repairability and has a surface coefficient of kinetic friction with respect to copy paper of between 0.01 and 0.7 on the transparent supporting member.

2. The transparent plate for a platen according to claim 1, wherein a temperature at which the self-repairability develops in the transparent protective layer is 10° C. to 100° C.

3. The transparent plate for a platen according to claim 1, wherein a temperature at which the self-repairability develops in the transparent protective layer is 10° C. to 80° C.

4. The transparent plate for a platen according to claim 1, wherein the coefficient of kinetic friction of the transparent protective layer is 0.4 or less.

5. The transparent plate for a platen according to claim 1, wherein the rupture critical stress of the transparent protective layer is 21 kgf/mm$^2$ or more.

6. The transparent plate for a platen according to claim 1, wherein the rupture critical stress of the transparent protective layer is 60 kgf/mm$^2$ or more.

7. The transparent plate for a platen according to claim 1, wherein the transparent protective layer is a urethane resin formed by polymerizing an acryl resin and isocyanate, or a urethane resin formed by polymerizing an acryl resin, silicone, and isocyanate.

8. The transparent plate for a platen according to claim 7, wherein the urethane resin is formed of an acryl resin having a hydroxyl group.

9. The transparent plate for a platen according to claim 8, wherein the acryl resin formed by polymerizing monomer components, satisfies the following formula, $$([A]/([A]+[B]))\times 100 \geq 80$$

wherein [A] represents the molar quantity of the monomer component containing side-chain hydroxyl group having less than 10 carbon atoms (short side-chain hydroxyl group), and [B] represents the molar quantity of the monomer component containing side-chain hydroxyl group having 10 or more carbon atoms (long side-chain hydroxyl group).

10. The transparent plate for a platen according to claim 8, wherein the acryl resin satisfies the following formula, $$([A]/([A]+[B]))\times 100 \geq 90$$

wherein [A] represents the molar quantity of the monomer component containing side-chain hydroxyl group having less than 10 carbon atoms (short side-chain hydroxyl group), and [B] represents the molar quantity of the monomer component containing side-chain hydroxyl group having 10 or more carbon atoms (long side-chain hydroxyl group).

11. A document scanning apparatus comprising:
   the transparent plate for a platen according to claim 1;
   a document feeding unit that feeds an original document to be scanned one by one so that a scan surface side of the original document to be scanned is fed to the surface of the transparent plate for the platen on the transparent protective layer side; and
   a document scanning portion that scans a scan surface of the original document to be scanned from the opposite side of the transparent plate for the platen when the document scanning portion contacts the surface of the transparent plate for the platen on the transparent protective layer side.

12. The document scanning apparatus according to claim 11, further comprising:
   a heating apparatus that heats a portion of the transparent protective layer, which contacts the original document to be scanned fed by the document feeding portion.

13. An image forming apparatus comprising:
   an image information-scanning portion that has the document scanning apparatus according to claim 12, and scans image information from an original document to be scanned; and
   an image forming portion that forms images on a recording medium based on the image information scanned at the document scanning apparatus.

14. The document scanning apparatus according to claim 11,
   wherein a temperature at which the self-repairability develops in the transparent protective layer is 10° C. to 100° C.

15. An image forming apparatus comprising:
   an image information-scanning portion that has the document scanning apparatus according to claim 13, and scans image information from an original document to be scanned; and
   an image forming portion that forms images on a recording medium based on the image information scanned at the document scanning apparatus.

16. An image forming apparatus comprising:
an image information-scanning portion that has the document scanning apparatus according to claim 11 and scans image information from an original document to be scanned; and
an image forming portion that forms images on a recording medium based on the image information scanned at the document scanning apparatus.

* * * * *